United States Patent
Melcher

(10) Patent No.: US 8,387,740 B2
(45) Date of Patent: Mar. 5, 2013

(54) MOTOR VEHICLE WITH DIFFERENTIAL GEAR BOX PROVIDING ANGULAR MOVEMENT AND METHOD THEREFOR

(76) Inventor: Thomas W. Melcher, Mesa, AZ (US)

( * ) Notice: Subject to any disclaimer, the term of this patent is extended or adjusted under 35 U.S.C. 154(b) by 112 days.

(21) Appl. No.: 12/822,978

(22) Filed: Jun. 24, 2010

(65) Prior Publication Data
US 2010/0326761 A1 Dec. 30, 2010

Related U.S. Application Data

(60) Provisional application No. 61/220,022, filed on Jun. 24, 2009.

(51) Int. Cl.
*B60K 17/00* (2006.01)
*B60G 21/00* (2006.01)
*F16H 48/06* (2006.01)

(52) U.S. Cl. ............... 180/348; 29/893.1; 280/124.103; 464/906; 475/222

(58) Field of Classification Search ............... 29/893.1; 180/348, 350, 353–357, 359–361, 363, 364, 180/366, 368, 369, 374–385; 280/98, 103, 280/124.103; 464/1, 15, 111, 139–146, 160, 464/162, 170, 177–180, 182, 183, 904, 906; 475/220–253
See application file for complete search history.

(56) References Cited

U.S. PATENT DOCUMENTS

| | | | | |
|---|---|---|---|---|
| 2,791,919 A | * | 5/1957 | Wildhaber | 475/90 |
| 4,244,241 A | * | 1/1981 | Treadwell | 475/246 |
| 4,723,464 A | * | 2/1988 | Welschof et al. | 475/222 |
| 4,836,051 A | * | 6/1989 | Guimbretiere | 475/85 |
| 4,840,087 A | * | 6/1989 | Welschof et al. | 475/222 |
| 5,041,069 A | * | 8/1991 | Horst | 475/231 |
| 5,162,026 A | * | 11/1992 | Krisher | 475/248 |
| 5,704,868 A | * | 1/1998 | Lindsey et al. | 475/222 |
| 5,916,052 A | * | 6/1999 | Dick | 475/198 |
| 5,916,055 A | * | 6/1999 | Wormbaecher | 475/222 |
| 6,261,184 B1 | * | 7/2001 | Jacob et al. | 464/146 |
| 6,805,362 B1 | * | 10/2004 | Melcher | 280/5.52 |
| 6,896,637 B2 | * | 5/2005 | Krude et al. | 475/222 |
| 6,960,148 B2 | * | 11/2005 | Fuchs et al. | 475/222 |
| 7,001,302 B2 | * | 2/2006 | Wachter et al. | 475/230 |
| 7,011,594 B2 | * | 3/2006 | Krude et al. | 475/222 |
| 7,131,650 B2 | * | 11/2006 | Melcher | 280/5.52 |
| 7,252,616 B2 | * | 8/2007 | Wormsbaecher | 475/202 |
| 7,802,800 B2 | * | 9/2010 | Melcher | 280/5.509 |
| 7,931,286 B2 | * | 4/2011 | Melcher | 280/124.103 |
| 2010/0292016 A1 | * | 11/2010 | Wormsbaecher et al. | 464/144 |
| 2012/0098225 A1 | * | 4/2012 | Lucas | 280/124.103 |

* cited by examiner

*Primary Examiner* — Paul N Dickson
*Assistant Examiner* — Laura Freedman
(74) *Attorney, Agent, or Firm* — Robert D. Atkins; Patent Law Group: Atkins & Associates, P.C.

(57) ABSTRACT

A motor vehicle has a frame and drive mechanism mounted to the frame. A differential gear box is mounted to the frame and coupled to the drive mechanism. The differential gear box includes a housing cover, differential planetary gear assembly mounted within the housing cover, CV joint housing mounted within the housing cover and rotationally coupled to the planetary gear assembly, and CV joint bearing having a plurality of rounded bearing surfaces contacting the slotted bearing drive surfaces. The CV joint housing includes a cavity with a plurality of slotted bearing drive surfaces formed in a sidewall of the cavity. An axle has a spring-loaded plunger disposed through a center portion of the CV joint bearing and contacting a bearing surface formed in the cavity of the CV joint housing. The slotted bearing drive surfaces permit angular movement of the CV joint bearing within the CV joint housing.

39 Claims, 11 Drawing Sheets

MOTOR VEHICLE WITH DIFFERENTIAL GEAR BOX PROVIDING ANGULAR MOVEMENT AND METHOD THEREFOR

CLAIM TO DOMESTIC PRIORITY

The present non-provisional patent application claims the benefit of priority of provisional application Ser. No. 61/220, 022, entitled "Differential for Leaning Vehicle," filed Jun. 24, 2009.

FIELD OF THE INVENTION

The present invention relates in general to motor vehicles and, more specifically, to a motor vehicle with a differential gear box utilizing constant velocity (CV) joints as structural components within the differential gear box operation.

Many vehicles such as motorcycles are capable of leaning to one side or the other side by lowering their center of gravity to balance the centrifugal and gravitational forces encountered while cornering. Most motorcycles have two wheels so leaning the vehicle is natural. As a single track vehicle, motorcycles must be counter-steered to initiate lean; turning the wheel opposite of the desired direction uses the gyroscopic forces generated by the wheel to roll the vehicle in the desired direction. As the desired vector is approached the operator will begin to induce steering slip in the direction of lean to maintain the proper lean angle needed to negotiate the turn. Leaning also increases the contact area of the tire on the road surface and better positions the center of gravity on the line of force applied to the road surface by the motorcycle and rider.

Another type of leaning vehicle is disclosed in U.S. Pat. Nos. 6,805,362 and 7,131,650. These patents show a four-wheel vehicle having a frame and suspension with automatic lean and alignment. The lean is determined by force sensors, speed, and angle of turn and effected by actuators in the suspension, which enables the system to automatically select the amount of lean based on the speed and angle of turn of the vehicle. Alternatively, the angle of lean can be determined and automatically adjusted based on feedback from one or more sensors that are positioned to detect a distribution of gravitational and centrifugal forces.

The suspension uses an arm assembly for each wheel connected to the frame and a mechanical link mechanism forming an interconnection between the frame and the suspension. Each arm assembly has a lower arm, an upper control arm, and an actuator assembly mounted to the lower arm and pivotally connected to the upper control arm. The arm assemblies are actuated in concert to remain generally parallel to each other through a range of angles to adjust the lean of the vehicle. The arm assemblies are also actuated independently at each wheel to accommodate variations in the contour of the traveled surface.

The drive mechanism for a four-wheel leaning vehicle has some similarities to a standard vehicle, i.e., the motor turns a drive mechanism along the center axis of the vehicle, e.g., drive shaft, belt, or chain, to a differential gear box. The differential converts the rotation of the drive mechanism to a rotation of an axle normal to the center axis. The axle turns the wheels of the vehicle. The differential gear also allows the wheels of the vehicle to rotate at different rates relative to the drive mechanism. For example, in a corner, the outside wheel has a different rotational rate than the inside wheel due to the longer distance the outside wheel must travel, while maintaining a driving load to both wheels.

The drive mechanism for a four-wheel vehicle that leans through travel has some important additional requirements, namely the need to handle large angles of travel for the axle with respect to the horizontal plane. The lean of the vehicle, e.g., during turns or traversing a sloped surface, can induce angles of travel in the axle up to 60 degrees with respect to the ideal horizontal plane as the wheels camber with the lean of the vehicle. The conventional differential gear box limits the vehicle from attaining its maximum lean angle with respect to the angular capability of the inboard and outboard CV joints.

SUMMARY OF THE INVENTION

A need exists for a narrow differential gear box that will permit the drive joints i.e., constant velocity joints to achieve their maximum angularity. Accordingly, in one embodiment, the present invention is a motor vehicle comprising a frame and drive mechanism mounted to the frame. A differential gear box is mounted to the frame and coupled to the drive mechanism. The differential gear box includes a housing cover, differential planetary gear assembly mounted within the housing cover, CV joint housing mounted within the housing cover and rotationally coupled to the differential planetary gear assembly, and CV joint bearing having a plurality of rounded bearing surfaces contacting the slotted bearing drive surfaces. The CV joint housing includes a cavity opposite the differential planetary gear assembly with a plurality of slotted bearing drive surfaces formed in a sidewall of the cavity. An axle has a spring-loaded plunger disposed through a center portion of the CV joint bearing and contacting a bearing surface formed in the cavity of the CV joint housing. The slotted bearing drive surfaces permit angular movement of the CV joint bearing within the CV joint housing.

In another embodiment, the present invention is a differential gear box for a motor vehicle comprising a housing cover and differential planetary gear assembly mounted within the housing cover. A CV joint housing is mounted within the housing cover and rotationally coupled to the differential planetary gear assembly. The CV joint housing includes a cavity opposite the differential planetary gear assembly with a plurality of slotted bearing drive surfaces formed in a sidewall of the cavity. A CV joint bearing has a plurality of bearing surfaces contacting the slotted bearing drive surfaces. The slotted bearing drive surfaces permit angular movement of the CV joint bearing within the CV joint housing.

In another embodiment, the present invention is a differential gear box for a motor vehicle comprising a housing cover and gear assembly mounted within the housing cover. A CV joint housing is mounted within the housing cover and rotationally coupled to the gear assembly. The CV joint housing includes a plurality of slotted bearing drive surfaces formed in a sidewall of the CV joint housing. A CV joint has a plurality of bearing surfaces contacting the slotted bearing drive surfaces, wherein the slotted bearing drive surfaces permit angular movement of the CV joint within the CV joint housing.

In another embodiment, the present invention is a method of making a differential gear box for a motor vehicle comprising the steps of providing a housing cover, mounting a gear assembly within the housing cover, mounting a CV joint housing within the housing cover rotationally coupled to the gear assembly, forming a plurality of slotted bearing drive surfaces in a sidewall of the CV joint housing, and disposing a CV joint having a plurality of bearing surfaces within the CV joint housing to contact the slotted bearing drive surfaces and permit angular movement of the CV joint within the CV joint housing.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
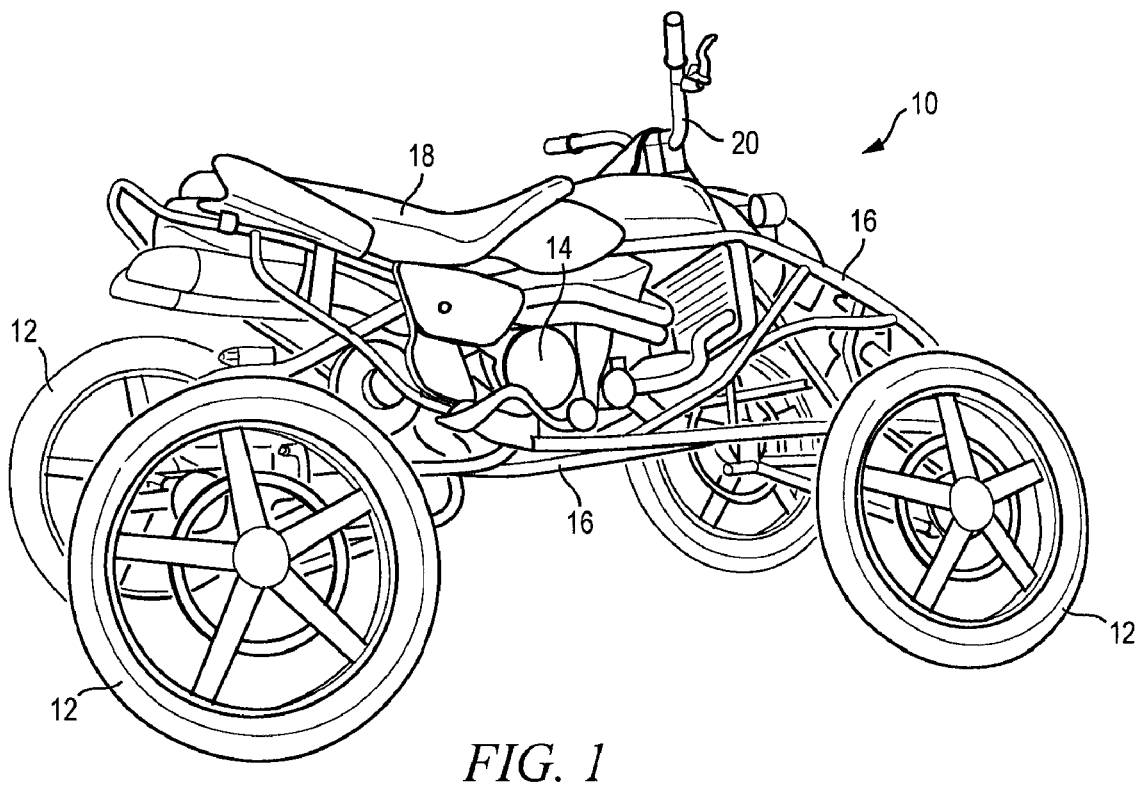
FIG. 1 illustrates a vehicle with frame and suspension to enhance leaning of the vehicle.

A motor vehicle 10 is shown in FIG. 1 supported on a frame and suspension assembly. Vehicle 10 has four wheels 12 and motor 14 mounted on frame 16. The rider sits on seat 18 and steers the vehicle with handlebars or steering assembly 20. Vehicle 10 has a unique leaning mechanism for turning while maintaining stability. The leaning system uses a load sensor to control floating piston shock absorbers by transferring fluid between the shocks in response to changes of pressure applied to the handlebars as detected by the load sensor.

Figure 2:
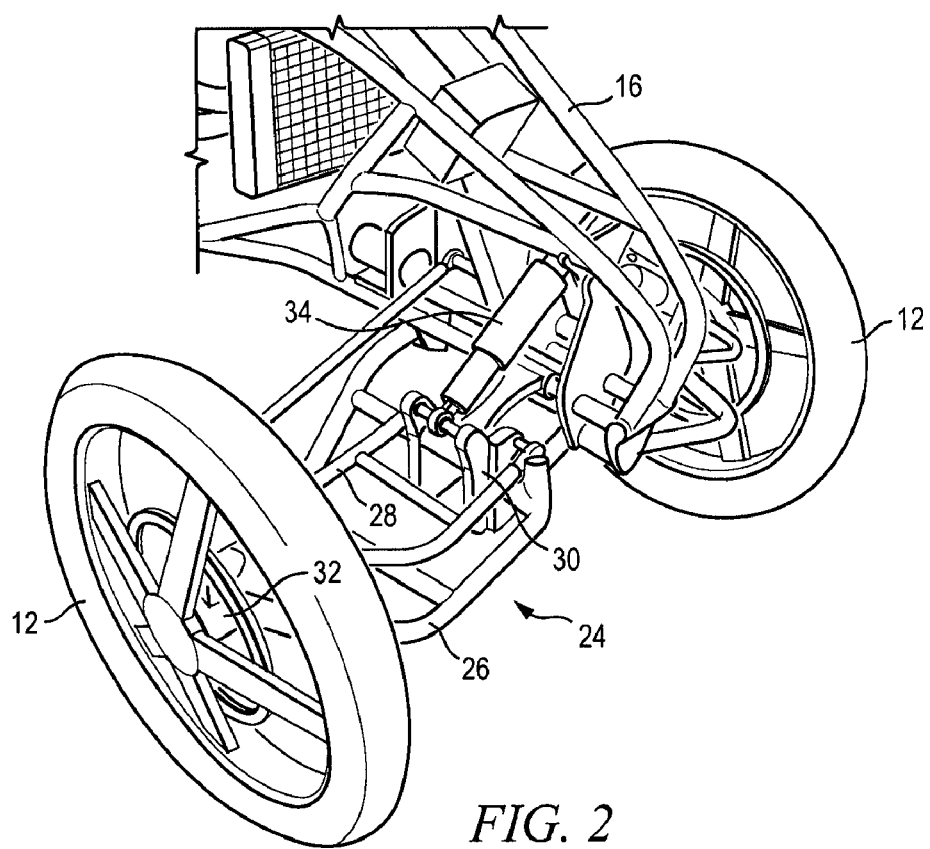
FIG. 2 illustrates a front portion of the frame and suspension.

Further detail of the vehicle's front frame and suspension assembly is shown in FIG. 2. Arm assembly 24 is mounted on either side of the frame and suspension assembly and independently and pivotally connected to frame 16. Each arm assembly 24 has a lower arm 26, upper control arm 28, actuator 30 connecting inboard ends of lower arm 26 and upper control arm 28, and a hub assembly 32 connecting the outboard ends of lower arm 26 and upper control arm 28. Each of the lower arm 26 and upper control arm 28, actuator 30, and hub assembly 32 are pivotally connected to each other. Further detail of the arm assemblies is disclosed in U.S. Pat. No. 6,805,362, entitled "Vehicle Lean and Alignment Control System," and U.S. Pat. No. 7,131,650, entitled "Vehicle Lean and Alignment Control System," which are fully incorporated herein by reference. In the present embodiment, the movement of actuator 30 is controlled by shock absorber 34 operating in response to the load sensors.

Figure 3:
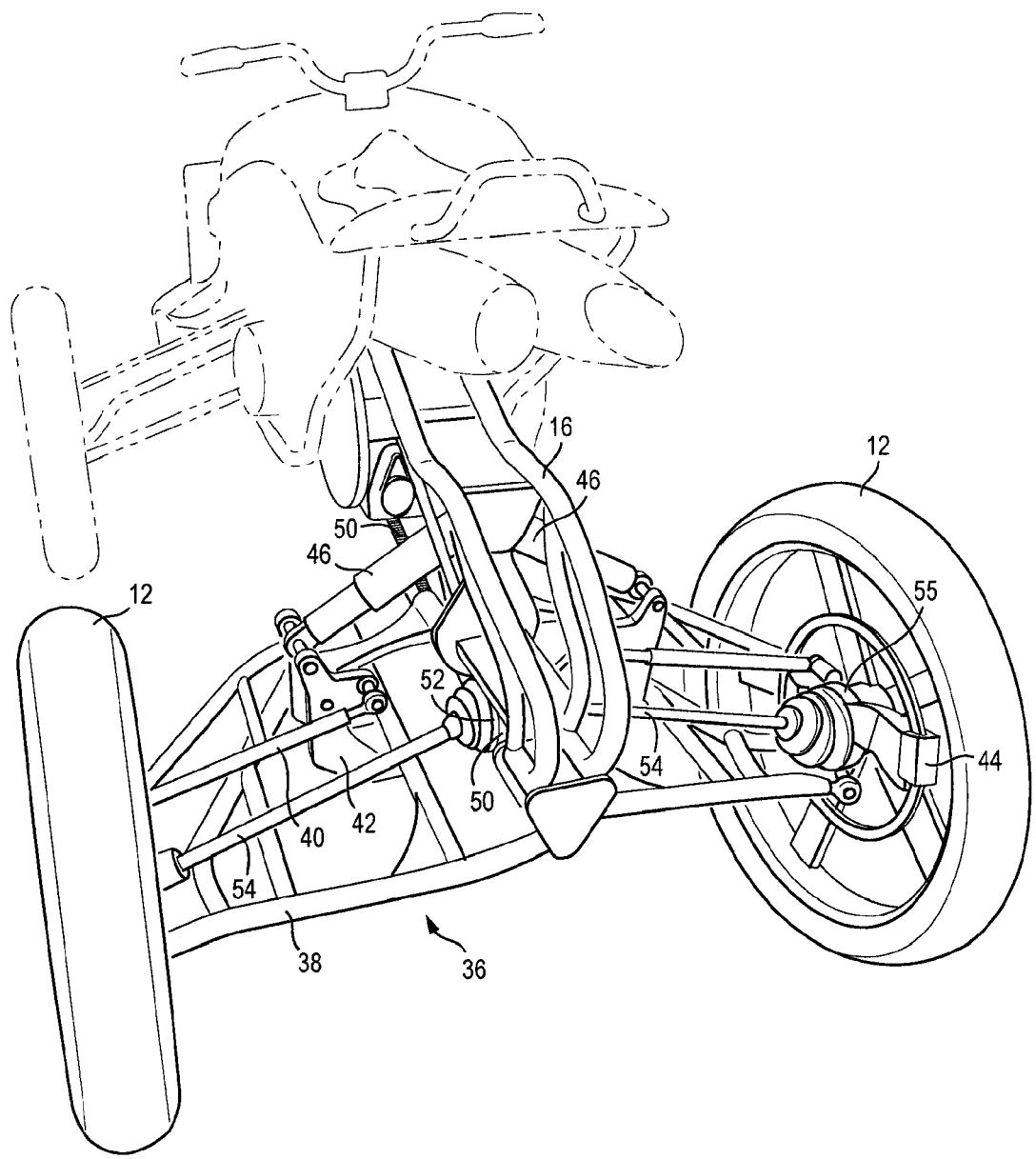
FIG. 3 illustrates a rear portion of the frame and suspension including the drift mechanism and differential gear box.

The rear frame and suspension assembly is shown in FIG. 3. Arm assembly 36 is located on either side of frame and suspension assembly and independently and pivotally connected to frame 16. Each arm assembly 36 has a lower arm 38, upper control arm 40, actuator 42 connecting inboard ends of lower arm 38 and upper control arm 40, and a hub assembly 44 connecting the outboard ends of lower arm 38 and upper control arm 40. Each of the lower arm 38 and upper control arm 40, actuator 42, and hub assembly 44 are pivotally connected to each other. In the present embodiment, the movement of actuator 42 is controlled by shock absorber 46 in response to the load sensor. The arm assemblies allow the frame to lean through a range of angles relative to a plane that is upright and substantially perpendicular to a level road surface.

In the drive assembly, chain or belt-driven drive mechanism 50 is located along a center portion of frame 16. Drive mechanism 50 drives differential gear box 52 which converts the rotation of the drive mechanism to a rotation of axle sections 54 to drive hub bearing carriers 55 and rear wheels 12.

Figure 4:
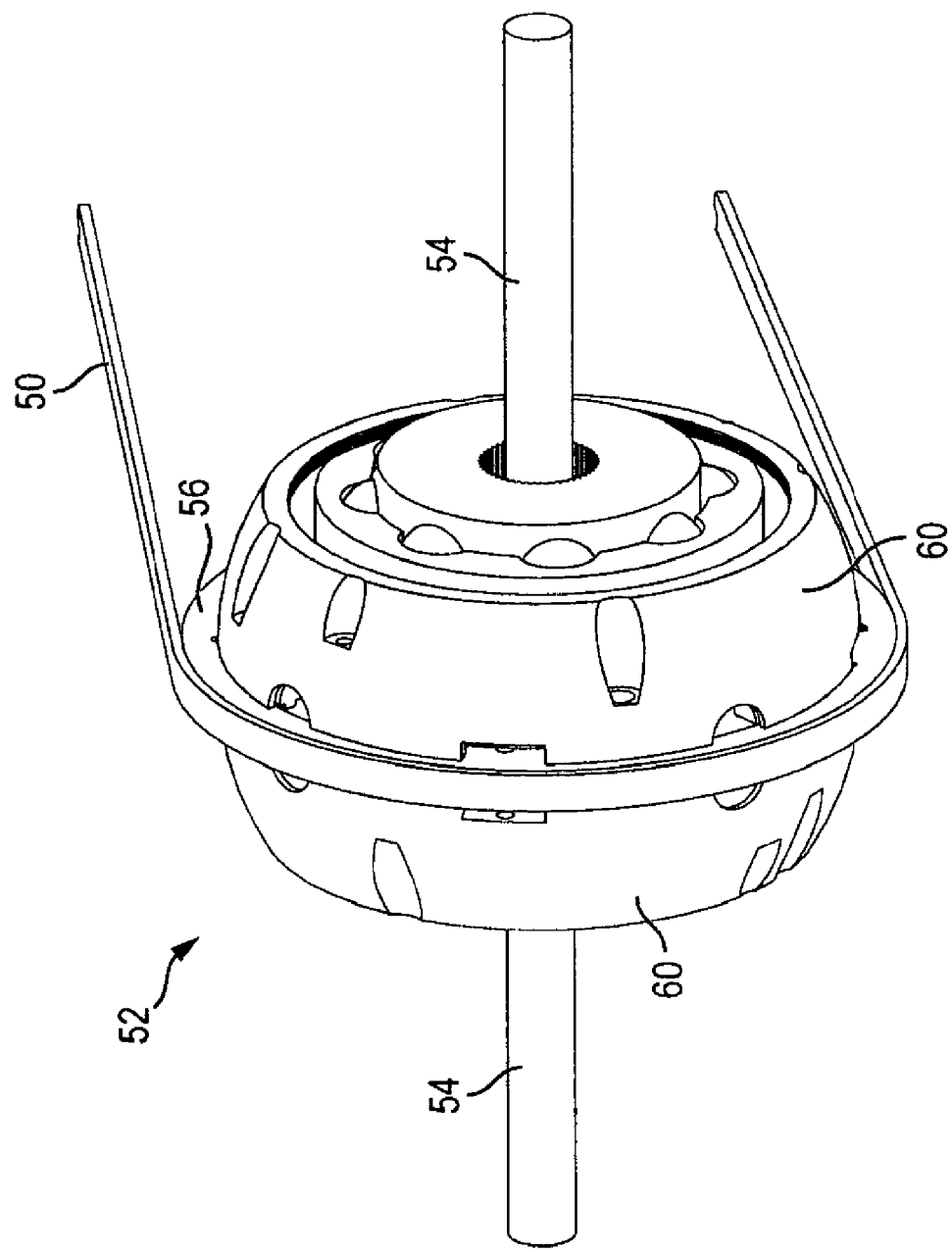
FIG. 4 illustrates the differential gear box and opposing axle sections.

FIG. 4 illustrates an exterior view of differential gear box 52 with differential housing covers 60 and two axle sections 54 extending from opposite sides of the housing covers to wheels 12. Drive mechanism 50 rotates drive sprocket 56, centrally located over housing cover 60, which turns differential gear box 52 as well as the two axle sections 54 to drive the two rear wheels 12.

Figure 5:
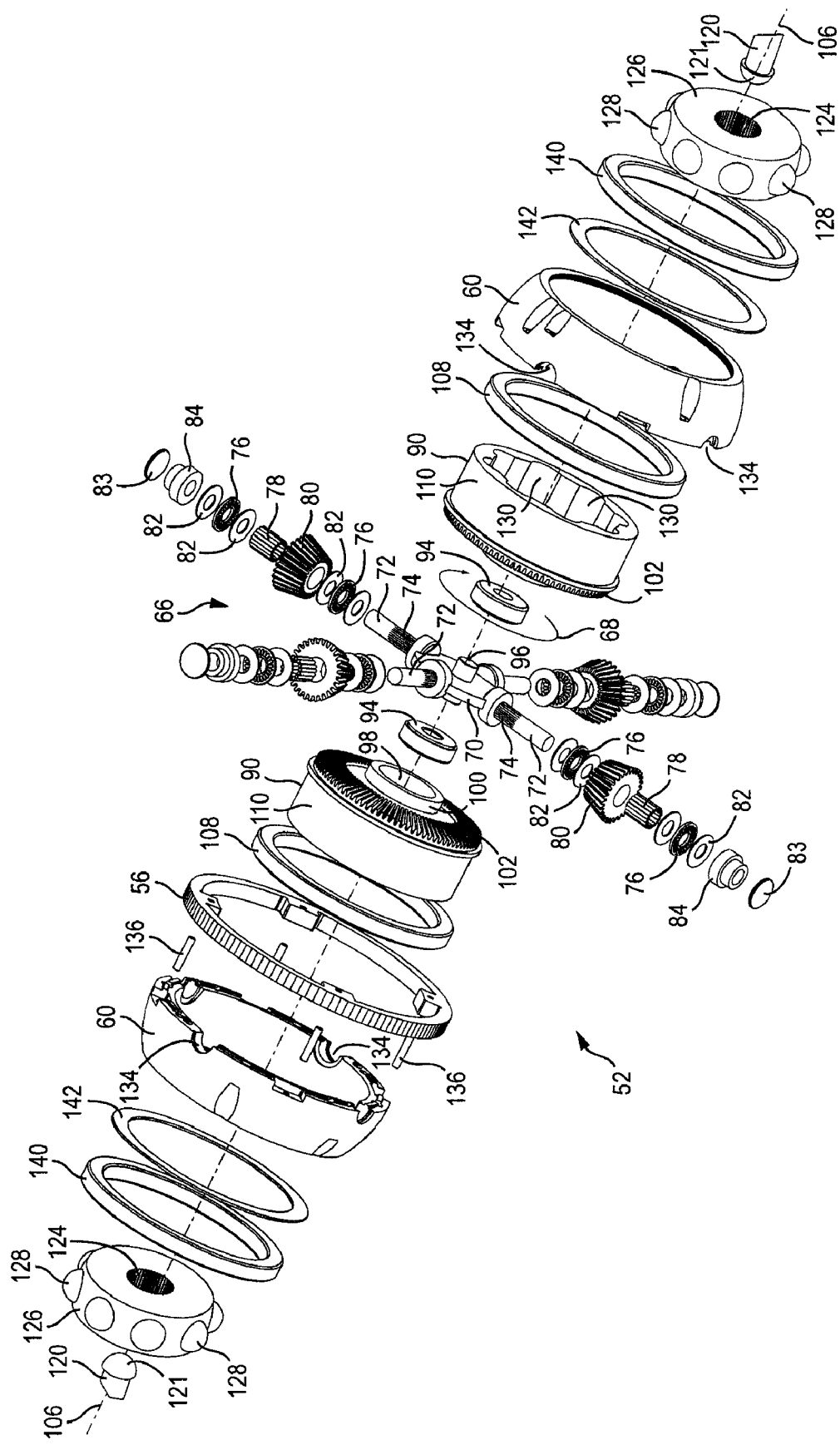
FIG. 5 illustrates an expanded view of the differential gear box, with differential planetary gear assembly, CV joint housing, and CV joint drive bearing.

FIG. 5 is an expanded view of differential gear box 52. A differential planetary gear assembly 66 is located within differential gear box 52. The differential planetary gear assembly 66 rotates in the direction of arrow 68 with housing cover 60 in response to drive mechanism 50 turning drive sprocket 56. Planetary gear hub assembly 70 supports four opposing planetary gear shafts 72 each with spline 74. Each planetary gear shaft 72 supports thrust bearings 76, needle bearing 78, bevel gears 80, retainer bushing 84, washers 82, and retainer 83. Retainer bushings 84 holds thrust bearings 76, needle bearing 78, and bevel gears 80 on the planetary gear shaft shoulder. The washers 82 operate as shims to position bevel gears 80 to properly engage with differential side gear 102.

CV joint housings 90 are mounted within housing cover 60 and rotationally coupled to differential planetary gear assembly 66 with support of thrust bearing and caged roller bearing 94. The inner race surface of caged roller bearing 94 is positioned over collar 96 of planetary gear hub assembly 70. The outer surface of caged roller bearing 94 is positioned on inner race surface 98 of collar 100 of CV joint housing 90. CV joint housings 90 have integral differential side gear 102 which mates with bevel gears 80 on each planetary gear shaft 72 to differentially transfer the rotation of planetary gear assembly 66 to the rotation of the CV joint housing in alignment around axis 106.

Without differential rotation, e.g., vehicle 10 traveling on a level surface and both rear wheels 12 rotating at the same rate, bevel gear 80 does not rotate around planetary gear shaft 72. The rotation of differential planetary gear assembly 66, in the direction of arrow 68, causes the teeth of bevel gears 80 to engage the teeth of differential side gear 102 and rotate CV joint housing 90. The differential planetary gear assembly 66 remains in constant velocity with CV joint housing 90. Without differential rotation, the same teeth of bevel gears 80 remain engaged with the same teeth of differential side gear 102 while transferring rotational motion to CV joint housing 90, i.e., bevel gear 80 moves with differential planetary gear assembly 66 in direction of arrow 68 but does not rotate around planetary shaft 72.

Differential rotation occurs when vehicle 10 is making a turn as rear wheels 12 rotate at different rates. With differential rotation, bevel gear 80 rotates around planetary gear shaft 72. While the rotation of differential planetary gear assembly 66 continues to transfer rotational motion to CV joint housings 90, the teeth of bevel gears 80 rotate around planetary gear shaft 72 and continuously engage with different teeth of differential side gear 102 during rotation of bevel gear 80. Yet, even with bevel gear 80 rotating about planetary gear shaft 72, the rotation of differential planetary gear assembly 66, in the direction of arrow 68, still causes the teeth of bevel gears 80 to engage with various teeth of differential side gear 102 and rotate CV joint housing 90.

An angular contact bearing 108 is positioned between CV joint housing 90 and housing covers 60. The inner race surface of angular contact bearing 108 is positioned over outer surface 110 of CV joint housing 90, and the outer surface of angular contact bearings 108 is positioned within the inner surface of housing covers 60. Angular contact bearing 108 maintains separation between CV joint housing 90 and housing cover 60, as well as supporting and retaining differential planetary gear assembly 66 within differential gear box 52 with respect to frame 16.

Figure 6:
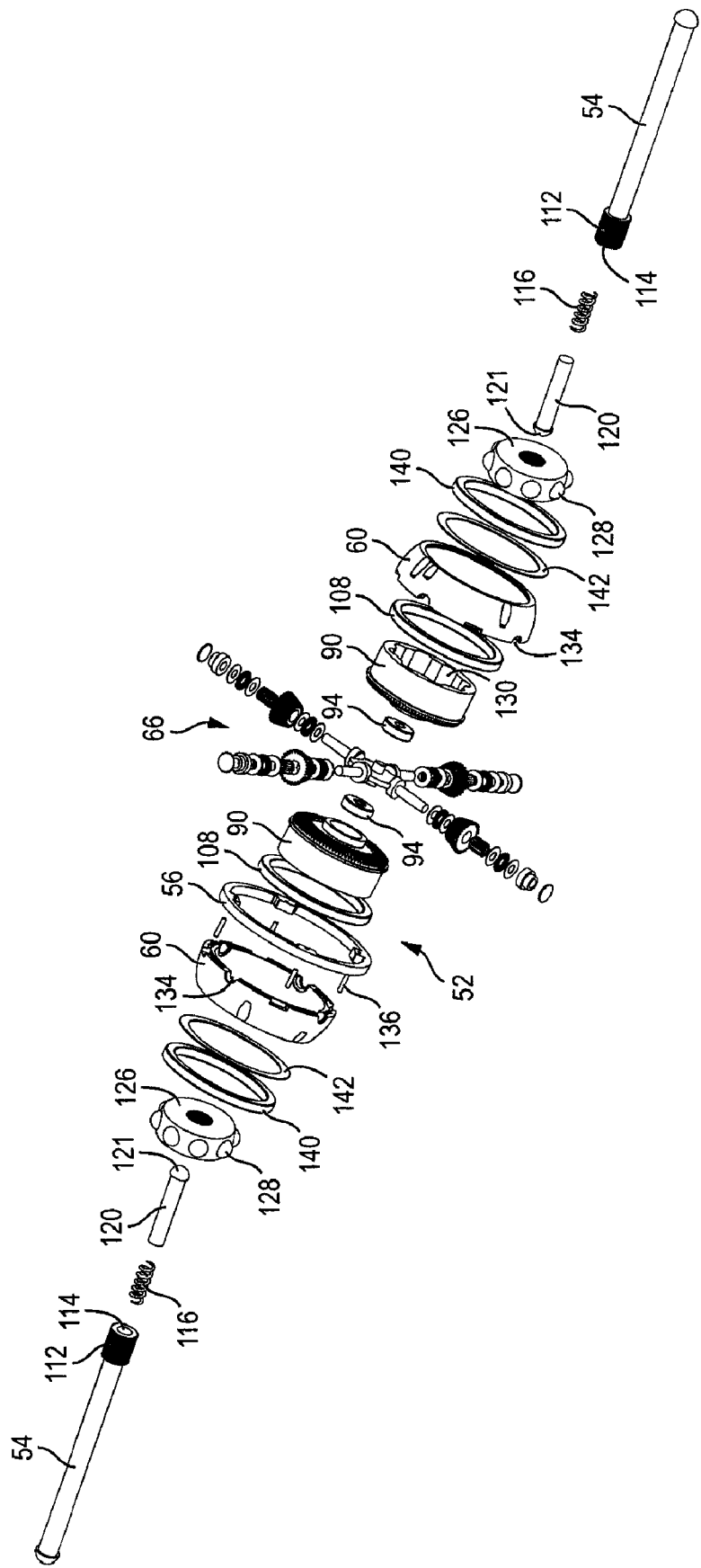
FIG. 6 illustrates the expanded view of the differential gear box with opposing axle sections.
Figure 7:
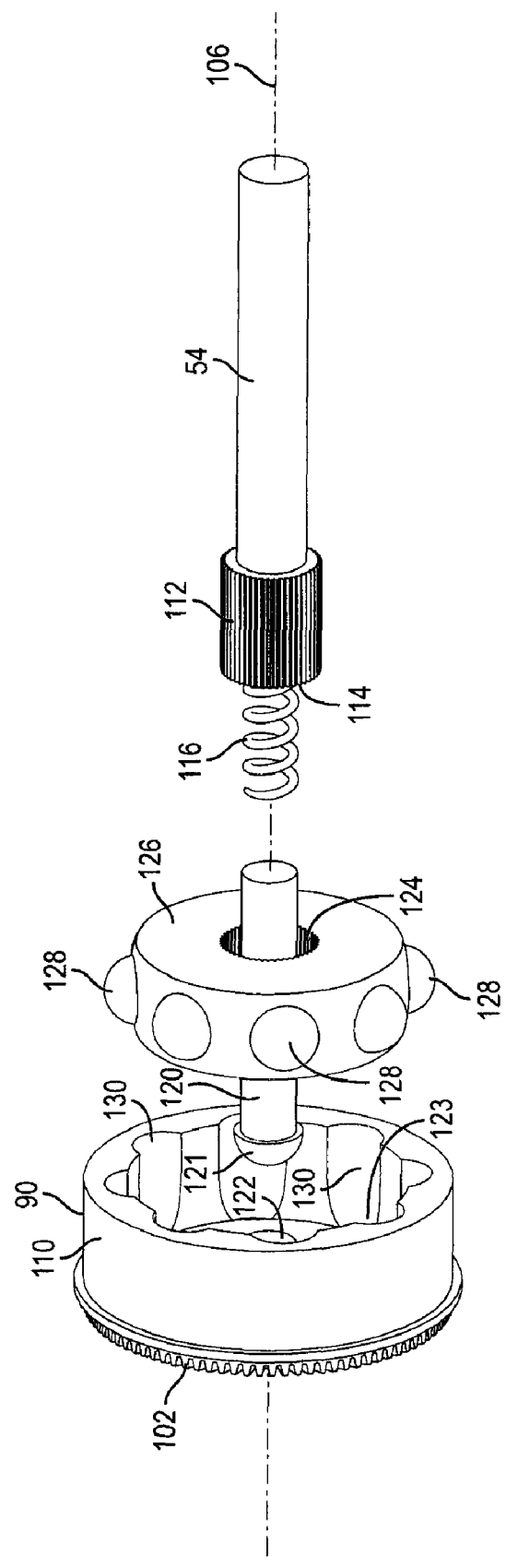
FIG. 7 illustrates further detail of the CV joint housing and CV joint drive bearing.

FIG. 6 shows a wider view of differential gear box 52 with axle sections 54 disposed on opposite sides of the differential gear box. Each axle section 54 includes spline 112 over hollow end 114. A spring 116 is disposed within hollow end 114 of axle section 54. A plunger bearing 120 is placed over spring 116 with a first end partially disposed within hollow end 114 of axle section 54. Plunger bearing 120 is actuated by spring 116 sliding within a bearing located in hollow distal end 114 of axle 54. A distal end of plunger bearing 120 has a rounded bearing surface 121 to ride on a concave bearing surface 122 centrally located on a back surface of CV joint housing 90, as seen in FIG. 7.

The concave bearing surface 122 and a plurality of concave grooves or slotted bearing drive surfaces 130 are machined directly into cavity 123 of CV joint housing 90, opposite the differential planetary gear assembly 66. Plunger bearing 120 is placed through center opening 124 of CV joint drive bearing 126. Male spline 112 of axle 54 mates with a female spline formed within center opening 124.

Figure 8:
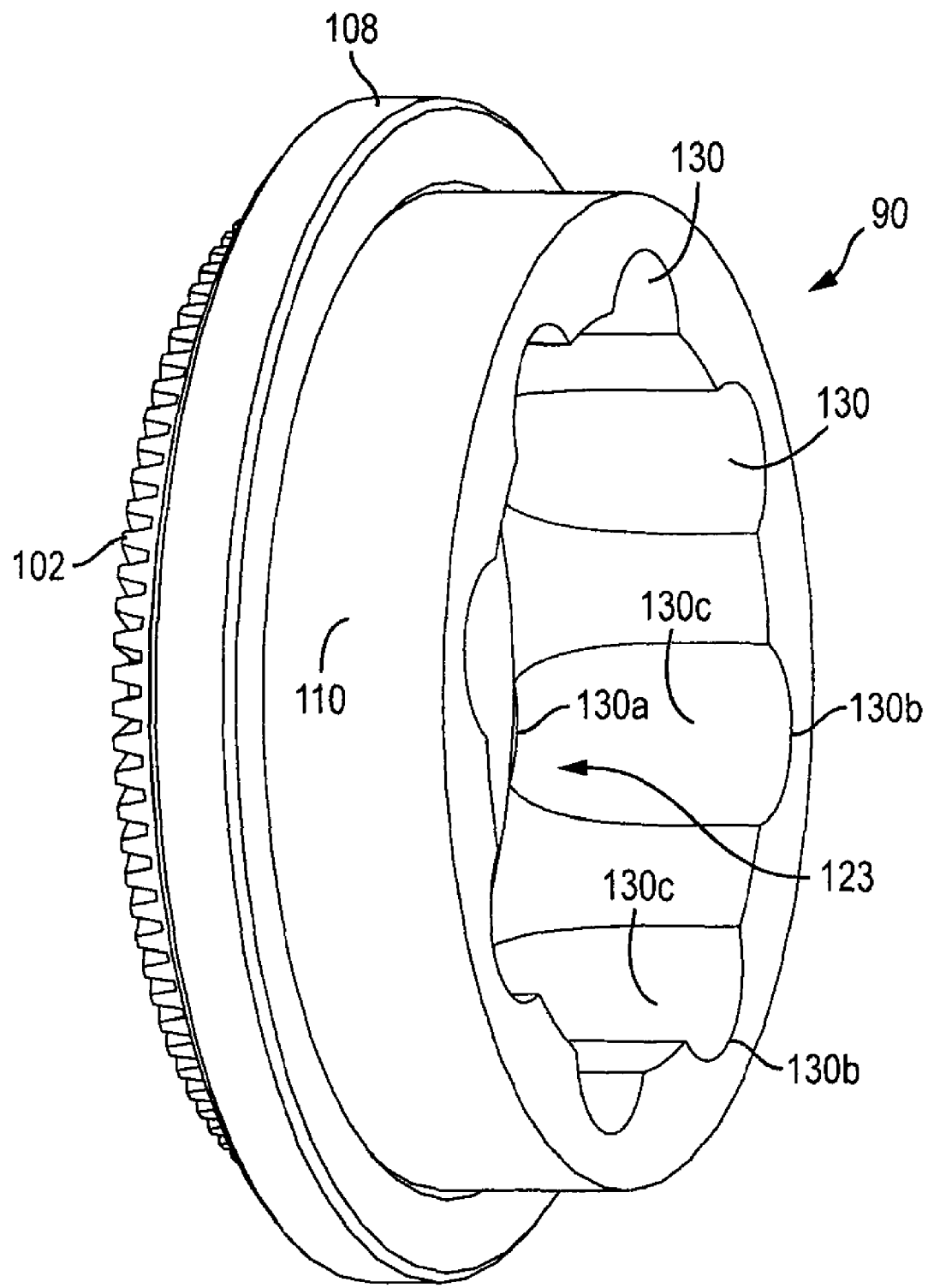
FIG. 8 illustrates concave side gear surfaces formed in a sidewall of the CV joint housing.

CV joint drive bearing 126 includes a plurality of rounded bearing surfaces 128 which ride on concave slotted bearing drive surfaces 130 extending substantially the width of the inside sidewall of CV joint housing 90, as shown in FIG. 8. The slotted bearing drive surfaces 130 are contoured to capture rounded bearings 128 between inner and outer races allowing the joint to transfer torque at varying angles of operation. The spring-loaded plunger bearing 120 supports CV joint drive bearing 126 by providing triangulated support outside of CV drive bearings 126 normal drive surfaces 128.

By spring-loading axle 54 with distal ends having interlocking male drive features coupled to the interlocking female drive features of the inner race of the CV joint drive bearing 126, the axle is put in compression across the CV joint drive bearings, supported at either end by plunger bearing 120 acting against the concave bearing surface 122 machined into the outer race of CV joint housings 90. The male and female drive features transfer torque through the axle as spring-loaded plunger bearings loads axle against concave bearing surface at center portion of CV joint housing 90. Spring loading axle 54 across CV joint housings 90 isolates the axle relative to the CV joint housings, thereby reducing spline sticktion and allowing the CV joint drive bearings 126 to find placement with reduced side loads. Plunger bearing 120 adds an additional bearing surface outside of the rotational drive path of CV drive bearings 126 which triangulates the CV joint drive bearings and provides the additional stability needed to operate at increased speed and angle.

Figure 9:
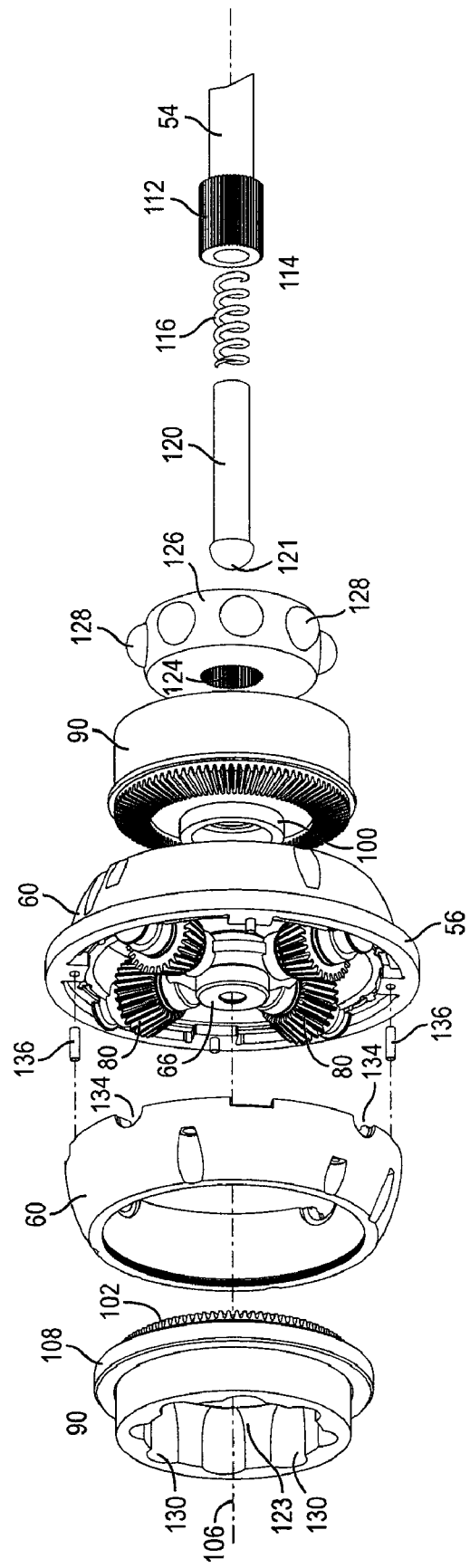
FIG. 9 illustrates the differential planetary gear assembly mounted within the housing covers.

FIG. 9 shows differential planetary gear assembly 66 mounted within housing cover 60. The opposing planetary gear shafts 72 of differential planetary gear assembly 66 lock into bores 134 formed within housing cover 60 with alignment pins 136 to maintain fixed rotation and alignment between the housing cover and differential planetary gear assembly. Bevel gear 80 contacts differential side gear 102 of CV joint housing 90. The rotation of differential planetary gear assembly 66, as driven by drive mechanism 50 rotating drive sprocket 56 and housing cover 60, turns CV joint housing 90. The rotation of CV joint housing 90 turns CV joint drive bearing 126 by nature of rounded bearing surfaces 128 disposed within concave slotted bearing drive surfaces 130 of the CV joint housing. The rotation of CV joint drive bearing 126 turns axle section 54 by nature of spline 112 contacting the female spline in opening 126. The rotation of axle section 54 turns wheel 12.

Figure 10:
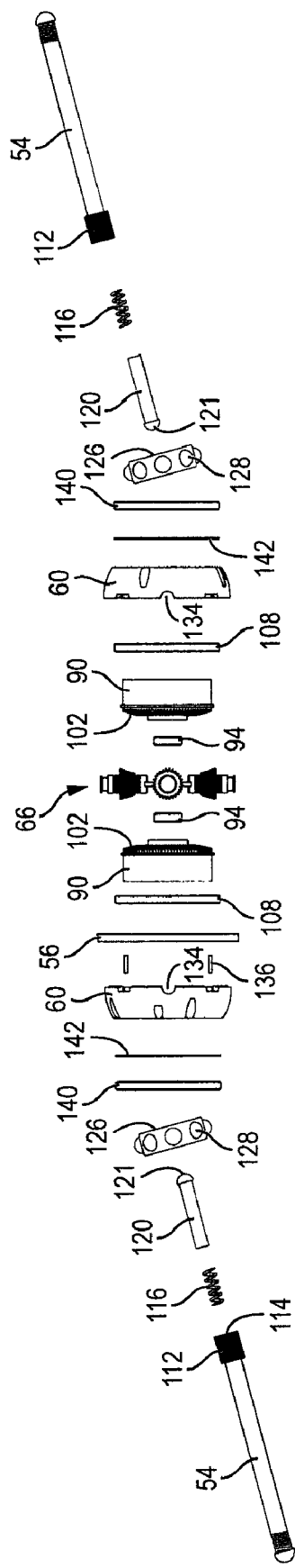
FIG. 10 illustrates the axles angled with respect to the CV joint housing.
Figure 11:
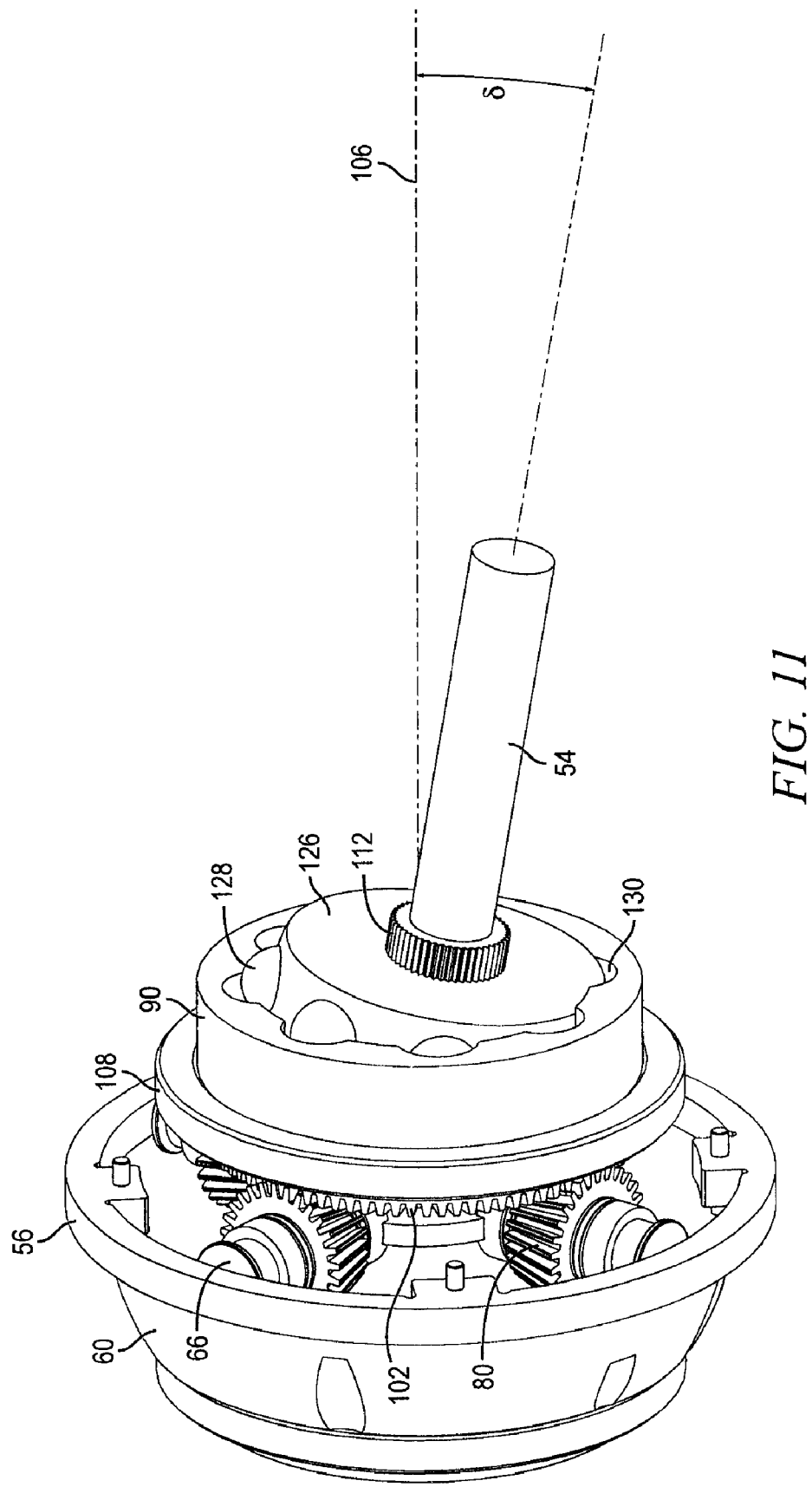
FIG. 11 illustrates the axle and CV joint drive gear engaged with an angle of travel within the CV joint housing.

In differential operation, such as during a turn as the rider leans to the right or the left, axles sections 54 have angle δ with respect to axis 106, as shown in FIG. 10. CV joint drive bearing 126 tilts within CV joint housing 90 such that one bearing surface 128 rides on an inboard portion 130a of slotted bearing drive surfaces 130 and an opposing bearing surface 128 rides on an outboard portion 130b of slotted bearing drive surfaces 130, as seen in FIGS. 8 and 11. Spring 116 maintains pressure on plunger bearing 120 to keep the rounded distal end 121 in contact with bearing surface 122 within CV joint housing 90. Plunger bearing 120 thus maintains a central alignment of opening 124 of CV joint drive bearing 126 within CV joint housing 90. Spring-loaded plunger bearing 120 triangulates and stabilizes the CV joint drive bearing for smooth running at high angularity. The spring loaded plunger bearing also reduces the loaded spline joint hysteresis and allows the spline joint to move freely thereby reducing side load on CV joint bearing drive 126. CV joint housing 90 continues to rotate CV joint drive bearing 126 by nature of bearing surfaces 128 around the CV joint drive bearing contacting a plurality of points 130c of slotted bearing drive surfaces 130 between inboard portion 130a and outboard portion 130b of the CV joint housing. Slotted bearing drive surfaces 130 permit angular movement of CV joint drive bearing 126 within CV joint housing 90.

Differential gear box 52 provides minimum width and maximum angular movement of CV joint drive bearing 126 within CV joint housing 90. CV joint housing 90 is an integral part of differential gear box 52. The slotted bearing drive surfaces 130 permit rotational movement of CV joint drive bearings 90, which in turn provide for angular axle movement up to 60 degrees. Accordingly, CV joint drive bearing 126 engaging CV joint housing 90 with various angles of travel serve both functions as a gear assembly and bearing surface.

Returning to FIG. 5, angular contact bearings 140 with spacer 142 is positioned within a slot around housing cover 60. Angular contact bearings 140 are rigidly attached to frame 16 to support rotation of differential gear box 52. Spacer 142 provides separation between angular contact bearings 140 so that the outer bearing (the bearing that attaches the differential to the frame) can provide additional side load support to the inner angular contact bearing.

Figure 12:
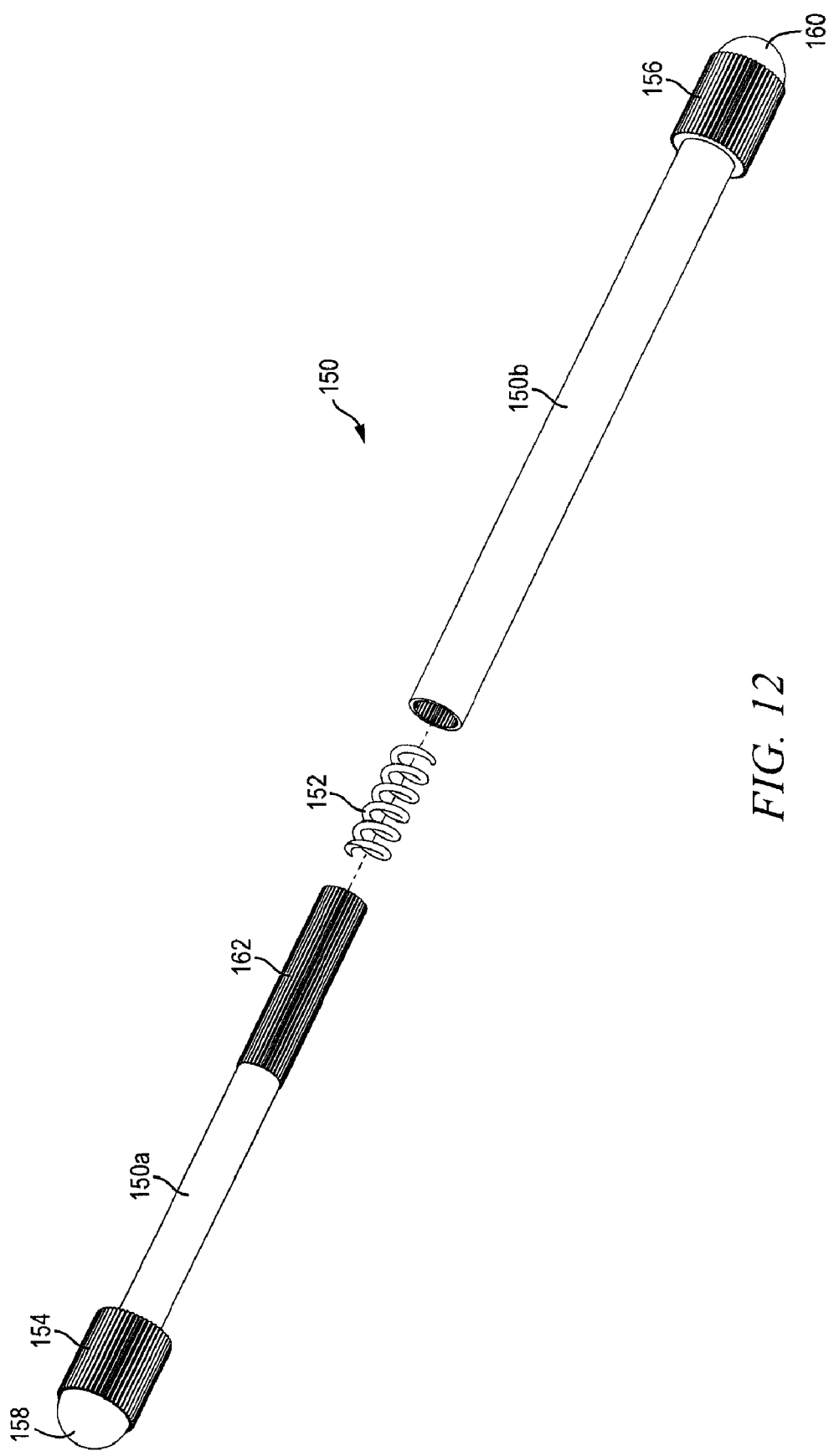
FIG. 12 illustrates an alternate embodiment of the axle section with a spring inserted centrally between the axle portions.

An alternative embodiment of the axle section is shown in FIG. 12 with a break in a central or interior portion of axle section 150. The ends of the break in axle section 150 are hollow to house spring 152. The integrated splines 154 and 156 are disposed at opposing ends of shaft sections 150*a* and 150*b* adjacent to rounded bearing surfaces 158 and 160. An integrated spline 162 is disposed along an interior portion of shaft section 150*a*. Spline 162 inserts into a female spline formed in the hollow end of axle section 150*b*. Spline 154 is inserted into opening 124 so that rounded bearing surface 158 contacts concave bearing surface 122. Spring 152 asserts pressure to keep bearing surface 158 against bearing surface 122 within CV joint housing 90. Axle section 150 thus maintains a central alignment of opening 124 of CV joint drive bearing 126 within CV joint housing 90.

Differential gear box 52 can be mounted to a front portion of frame 16 to drive the front wheels 12. Differential gear box 52 can be used for non-leaning motor vehicles, such as automobiles, trucks, all terrain vehicles, motorcycles, commercial vehicles, and government and military vehicles, particularly those designed for rugged applications.

While one or more embodiments of the present invention have been illustrated in detail, the skilled artisan will appreciate that modifications and adaptations to those embodiments may be made without departing from the scope of the present invention as set forth in the following claims.

What is claimed is:

1. A motor vehicle, comprising:
   a frame;
   a drive mechanism mounted to the frame;
   a differential gear box mounted to the frame and coupled to the drive mechanism, the differential gear box including,
   (a) a housing cover,
   (b) a differential planetary gear assembly mounted within the housing cover,
   (c) a constant velocity (CV) joint housing mounted within the housing cover and rotationally coupled to the differential planetary gear assembly, the CV joint housing including a cavity opposite the differential planetary gear assembly with a plurality of slotted bearing drive surfaces formed in a sidewall of the cavity, and
   (d) a CV joint bearing including a plurality of rounded bearing surfaces contacting the slotted bearing drive surfaces; and
   an axle including a spring-loaded plunger disposed through a center portion of the CV joint bearing and contacting a bearing surface formed in the cavity of the CV joint housing, wherein the slotted bearing drive surfaces permit angular movement of the CV joint bearing within the CV joint housing.

2. The motor vehicle of claim 1, further including an angular contact bearing disposed between the housing cover and CV joint housing.

3. The motor vehicle of claim 1, wherein the slotted bearing drive surfaces permit angular movement of the CV joint bearing within the CV joint housing up to 60 degrees.

4. The motor vehicle of claim 1, wherein the CV joint housing transfers rotational movement through the slotted bearing drive surfaces contacting the rounded bearing surfaces of the CV joint bearing to turn the axle.

5. The motor vehicle of claim 1, wherein the differential planetary gear assembly includes:
   a hub;
   a plurality of shafts extending from the hub; and
   a bevel gear mounted over each shaft and rotationally coupled to the CV joint housing.

6. The motor vehicle of claim 1, wherein the motor vehicle is a leaning motor vehicle.

7. A differential gear box for a motor vehicle, comprising:
   a housing cover;
   a differential planetary gear assembly mounted within the housing cover with the differential planetary gear assembly including a hub capable of rotating about an axis, a plurality of planetary gear shafts extending from the hub perpendicular to the axis, and a bevel gear mounted to each planetary gear shaft;
   a constant velocity (CV) joint housing mounted within the housing cover, the CV joint housing including:
      a differential side gear integrated into a first surface of the CV joint housing and rotationally coupled to the differential planetary gear assembly,
      a cavity formed in a second surface of the CV joint housing opposite the differential planetary gear assembly with a plurality of slotted bearing drive surfaces formed in a sidewall of the cavity, and
      a collar integrated into the first surface of the CV joint housing with the collar supporting the differential planetary gear assembly within the housing cover; and
   a CV joint bearing including a plurality of bearing surfaces contacting the slotted bearing drive surfaces, wherein the slotted bearing drive surfaces permit angular movement of the CV joint bearing within the CV joint housing.

8. The differential gear box of claim 7, wherein the slotted bearing drive surfaces are concave.

9. The differential gear box of claim 7, further including a spring-loaded axle with distal end including a bearing surface disposed through a center portion of the CV joint bearing and contacting a bearing surface formed in the cavity of the CV joint housing.

10. The differential gear box of claim 9, wherein the spring-loaded axle includes:
    a spring disposed in a hollow distal end of the axle; and
    a plunger mounted over the spring in the hollow distal end of the axle.

11. The differential gear box of claim 9, wherein the spring-loaded axle includes:
    a first axle portion including a hollow end and bearing end;
    a second axle portion including a closed end and bearing end; and
    a spring disposed in the hollow end of the first axle portion, wherein the first axle portion and second axle portion are brought together to enclose the spring.

12. The differential gear box of claim 7, wherein the slotted bearing drive surfaces permit angular movement of the CV joint bearing within the CV joint housing up to 60 degrees.

13. The motor vehicle of claim 7, further including an angular contact bearing disposed between the housing cover and CV joint housing.

14. A differential gear box for a motor vehicle, comprising:
    a housing cover;
    a gear assembly mounted within the housing cover with the gear assembly including a hub capable of rotating about an axis, a plurality of planetary gear shafts extending from the hub perpendicular to the axis, and a bevel gear mounted to each planetary gear shaft;
    a constant velocity (CV) joint housing mounted within the housing cover including a differential side gear integrated into a surface of the CV joint housing and rotationally coupled to the gear assembly and a plurality of slotted bearing drive surfaces formed in a sidewall of the CV joint housing; and a CV joint bearing including a plurality of bearing surfaces contacting the slotted bearing drive surfaces, wherein the slotted bearing drive surfaces permit angular movement of the CV joint bearing within the CV joint housing.

15. The differential gear box of claim 14, wherein the bearing surfaces of the CV joint bearing are concave.

16. The differential gear box of claim 14, wherein the slotted bearing drive surfaces permit angular movement of the CV joint bearing within the CV joint housing up to 60 degrees.

17. The differential gear box of claim 14, wherein the motor vehicle is a leaning motor vehicle.

18. The differential gear box of claim 14, further including an angular contact bearing disposed between the housing cover and CV joint housing.

19. A differential gear box for a motor vehicle, comprising:
a housing cover;
a gear assembly mounted within the housing cover;
a constant velocity (CV) joint housing mounted within the housing cover and rotationally coupled to the gear assembly, the CV joint housing including a plurality of slotted bearing drive surfaces formed in a sidewall of the CV joint housing;
a CV joint including a plurality of bearing surfaces contacting the slotted bearing drive surfaces, wherein the slotted bearing drive surfaces permit angular movement of the CV joint within the CV joint housing; and
a spring-loaded axle with distal end including a bearing surface disposed through a center portion of the CV joint and contacting a bearing surface formed in the CV joint housing.

20. The differential gear box of claim 19, wherein the spring-loaded axle includes:
a spring disposed in a hollow distal end of the axle; and
a plunger mounted over the spring in the hollow distal end of the axle.

21. The differential gear box of claim 19, wherein the spring-loaded axle includes:
a first axle portion including a hollow end and bearing end;
a second axle portion including a closed end and bearing end; and
a spring disposed in the hollow end of the first axle portion, wherein the first axle portion and second axle portion are brought together to enclose the spring.

22. The differential gear box of claim 19, further including an angular contact bearing disposed between the housing cover and CV joint housing.

23. A method of making a differential gear box for a motor vehicle, comprising:
providing a housing cover;
mounting a gear assembly within the housing cover;
mounting a constant velocity (CV) joint housing within the housing cover rotationally coupled to the gear assembly;
forming a plurality of slotted bearing drive surfaces in a sidewall of the CV joint housing opposite the gear assembly;
disposing a CV joint including a plurality of bearing surfaces within the CV joint housing to contact the slotted bearing drive surfaces and permit angular movement of the CV joint within the CV joint housing; and
disposing a spring-loaded axle with distal end including a bearing surface through a center portion of the CV joint to contact the CV joint housing.

24. The method of claim 23, wherein the CV joint housing transfers rotational movement through the slotted bearing drive surfaces contacting the bearing surfaces of the CV joint to turn the spring-loaded axle.

25. The method of claim 23, further including disposing an angular contact bearing between the housing cover and CV joint housing.

26. A method of making a differential gear box for a motor vehicle, comprising:
providing a housing cover;
mounting a gear assembly within the housing cover;
mounting a constant velocity (CV) joint housing within the housing cover including a differential side gear integrated into a first surface of the CV joint housing and rotationally coupled to the gear assembly;
forming cavity through a second surface of the CV joint housing opposite the first surface;
forming a plurality of slotted bearing drive surfaces in a sidewall of the cavity; and
disposing a CV joint bearing including a plurality of bearing surfaces within the CV joint housing to contact the slotted bearing drive surfaces.

27. The method of claim 26, wherein the bearing surfaces of the CV joint bearing are concave.

28. The method of claim 26, wherein the slotted bearing drive surfaces permit angular movement of the CV joint bearing within the CV joint housing up to 60 degrees.

29. The method of claim 26, wherein the sidewall of the CV joint housing is within a cavity of the CV joint housing opposite the gear assembly.

30. The method of claim 26, further including disposing an angular contact bearing between the housing cover and CV joint housing.

31. The method of claim 26, further including applying a force between a first half of the housing cover and a second half of the housing cover sufficient to secure the gear assembly within the housing cover and while maintaining proper alignment between the housing cover and the gear assembly.

32. A method of making a differential gear box for a motor vehicle, comprising:
providing a housing cover;
mounting a gear assembly within the housing cover;
mounting a constant velocity (CV) joint housing within the housing cover including an integral differential side gear rotationally coupled to the gear assembly;
forming a plurality of slotted bearing drive surfaces in a sidewall of the CV joint housing;
disposing a CV joint bearing including a plurality of bearing surfaces within the CV joint housing to contact the slotted bearing drive surfaces; and
disposing a spring-loaded axle with distal end including a bearing surface through a center portion of the CV joint bearing to contact the CV joint housing.

33. The method of claim 32, wherein the CV joint housing transfers rotational movement through the slotted bearing drive surfaces contacting the bearing surfaces of the CV joint bearing to turn the spring-loaded axle.

34. A differential gear box for a motor vehicle, comprising:
a housing cover;
a planetary gear hub assembly mounted within the housing cover and including a hub capable of rotating about an axis, a plurality of planetary gear shafts extending from the hub perpendicular to the axis, and a bevel gear mounted to each planetary gear shaft; and
a constant velocity (CV) joint housing mounted within the housing cover including a differential side gear integrated into a first surface of the CV joint housing and rotationally coupled to the planetary gear hub assembly.

35. The differential gear box of claim 34, wherein the first surface of the CV joint housing is capable of rotating about the axis.

36. The differential gear box of claim 34, further including a cavity formed through a second surface of the CV joint housing opposite the first surface.

37. The differential gear box of claim 36, further including a plurality of slotted bearing drive surfaces formed through a sidewall of the cavity.

38. The differential gear box of claim 34, further including a support structure integrated into the first surface of the CV joint housing with the support structure supporting the planetary gear hub assembly within the housing cover.

39. The differential gear box of claim 34, further including:
- a CV joint including a plurality of bearing surfaces mounted within the CV joint housing; and
- a spring-loaded axle disposed through a center portion of the CV joint.

* * * * *